United States Patent
Reynoso et al.

(10) Patent No.: US 11,147,264 B1
(45) Date of Patent: Oct. 19, 2021

(54) DECOY STAND WITH ROTATING ARM

(71) Applicants: Tyler James Reynoso, St. Charles, MO (US); Cody Christopher Shilharvey, Troy, MO (US)

(72) Inventors: Tyler James Reynoso, St. Charles, MO (US); Cody Christopher Shilharvey, Troy, MO (US)

( * ) Notice: Subject to any disclaimer, the term of this patent is extended or adjusted under 35 U.S.C. 154(b) by 254 days.

(21) Appl. No.: 16/524,326

(22) Filed: Jul. 29, 2019

Related U.S. Application Data

(60) Provisional application No. 62/711,882, filed on Jul. 30, 2018.

(51) Int. Cl.
*A01M 31/06* (2006.01)

(52) U.S. Cl.
CPC .................................. *A01M 31/06* (2013.01)

(58) Field of Classification Search
CPC ..................................................... A01M 31/06
USPC ............................................................ 43/2, 3
See application file for complete search history.

(56) References Cited

U.S. PATENT DOCUMENTS

| | | | | |
|---|---|---|---|---|
| 740,293 | A * | 9/1903 | Loeble | A01M 31/06 43/3 |
| 1,385,634 | A * | 7/1921 | Marshall | A63H 27/04 472/7 |
| 2,129,781 | A * | 9/1938 | Park | A01M 31/06 43/3 |
| 2,174,211 | A * | 9/1939 | Hutaff, Jr. | A01M 31/06 43/3 |
| 2,726,469 | A * | 12/1955 | Becker | A01M 31/06 43/3 |
| 2,952,090 | A * | 9/1960 | Pittenger | A01M 31/06 43/3 |
| 3,346,293 | A * | 10/1967 | Wilcox | A01M 31/06 294/106 |
| 3,471,153 | A * | 10/1969 | Baumler | F41J 9/02 273/359 |
| 3,736,688 | A | 6/1973 | Caccamo | |

(Continued)

FOREIGN PATENT DOCUMENTS

| | | | | |
|---|---|---|---|---|
| GB | 406386 | A * | 3/1934 | ............ A01M 31/06 |
| GB | 1308253 | A * | 2/1973 | ............ A01M 31/06 |
| GB | 2412560 | A * | 10/2005 | ............ A01M 31/06 |

OTHER PUBLICATIONS

Cabela's Northern Flight Vortex Combo [online]. Cabela's, Jul. 1, 2019. Retrieved from the Internet: <https://www.cabelas.com/product/CABELAS-VORTEX-COMBO/1641990.uts>.

*Primary Examiner* — Christopher P Ellis
(74) *Attorney, Agent, or Firm* — CreatiVenture Law, LLC; Dennis Jm Donahue, III; Kevin Staed

(57) ABSTRACT

The present invention is a decoy system that simulates waterfowl taking off and landing byway of a string, pulley and spring which collectively cause a crossbeam holding waterfowl decoys to raise and lower relative to the surface of the water in which the system sits. When the string is pulled one end of the crossbeam holding one decoy lowers and the opposite end of the beam holding either a counterweight or another decoy raises. When the string is released a spring attached to the opposite side of the beam from the string moves the beam towards its original position and thereby the string and spring actuate a teetering motion that provides a visual que on both sides of the hinge at the midpoint of the crossbeam.

20 Claims, 2 Drawing Sheets

(56) References Cited

U.S. PATENT DOCUMENTS

| | | | | |
|---|---|---|---|---|
| 4,965,953 A | * | 10/1990 | McKinney | A01M 31/06 43/2 |
| 5,375,363 A | * | 12/1994 | Higdon | A01M 31/06 43/3 |
| 5,832,649 A | * | 11/1998 | Kilgore | A01M 31/06 43/2 |
| 5,951,406 A | * | 9/1999 | Steane | A63G 11/00 472/111 |
| 6,311,425 B1 | * | 11/2001 | Capps | A01M 31/06 43/3 |
| 6,349,497 B1 | * | 2/2002 | Roddenbery | A01M 31/06 43/2 |
| 6,357,159 B1 | * | 3/2002 | Bowling | A01M 31/06 43/2 |
| 6,430,863 B1 | * | 8/2002 | Krag | A01M 31/06 43/3 |
| 6,625,919 B1 | * | 9/2003 | Davis | A01M 31/06 43/3 |
| 6,782,653 B1 | * | 8/2004 | Thomas | A01M 31/06 43/2 |
| 6,907,688 B2 | * | 6/2005 | Brint | A01M 31/06 40/417 |
| 7,536,823 B2 | | 5/2009 | Brint | |
| 8,256,155 B1 | * | 9/2012 | Goodwill | A01M 31/06 43/3 |
| 9,661,840 B1 | * | 5/2017 | Brain | A01M 31/06 |
| 9,850,103 B2 | | 12/2017 | Lopes et al. | |
| 2004/0237373 A1 | * | 12/2004 | Coleman | A01M 31/06 43/3 |
| 2005/0150149 A1 | * | 7/2005 | Highby | A01M 31/06 43/3 |
| 2008/0010892 A1 | * | 1/2008 | Goebel | A01M 31/06 43/2 |
| 2008/0092427 A1 | * | 4/2008 | Brint | A01M 31/06 43/2 |
| 2009/0235571 A1 | * | 9/2009 | Wyant | A01M 31/06 43/2 |
| 2012/0266775 A1 | * | 10/2012 | Buchta | A01M 31/06 104/134 |
| 2013/0104443 A1 | * | 5/2013 | Cramer | A01M 31/06 43/2 |
| 2013/0174466 A1 | * | 7/2013 | Saringer | A01M 31/06 43/2 |
| 2014/0208628 A1 | * | 7/2014 | McHugh | A01M 31/06 43/2 |
| 2014/0245652 A1 | * | 9/2014 | Franklin | A01M 31/06 43/2 |
| 2019/0297873 A1 | * | 10/2019 | Latschaw | A01M 31/06 |
| 2019/0335744 A1 | * | 11/2019 | Rodriguez | A01M 31/06 |

* cited by examiner

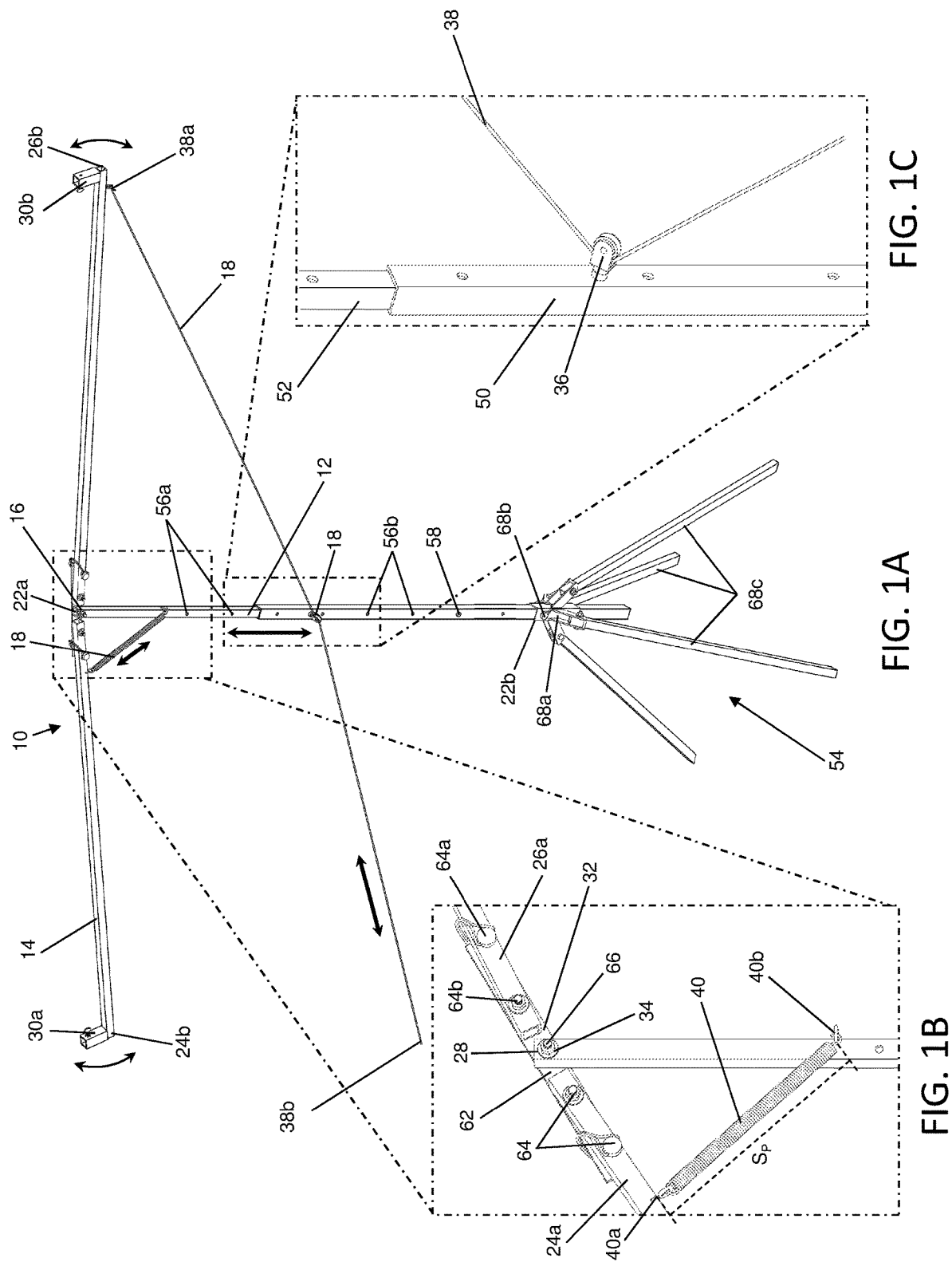

DECOY STAND WITH ROTATING ARM

CROSS-REFERENCE TO RELATED APPLICATIONS

This application claims priority from U.S. Provisional Patent Application No. 62/711,882 filed on Jul. 30, 2018.

STATEMENT REGARDING FEDERALLY SPONSORED RESEARCH

Not Applicable.

APPENDIX

Not Applicable.

BACKGROUND OF THE INVENTION

Field of the Invention

The present invention relates to waterfowl decoys, and more particularly to actuated waterfowl decoys having vertical movement.

Related Art

Waterfowl decoys have long been used for luring waterfowl into hunters decoy spreads to increase the likelihood of a successful hunt. Generally waterfowl decoy systems share the goal of simulating live waterfowl in an attempt to aid hunters in attracting game. Known decoys include solid floating decoys that merely float atop water proximate to a hunters blind while other known decoys simulate moving waterfowl, for example ducks as they land or takeoff from a water surface, by providing spinning-wings that may either be powered or wind operated. More complex decoy systems attempt to provide moving decoys that spin in a horizontal circle as well as other moving decoys that raise and lower vertically relative to the waterline. Accordingly, there is a continual desire to those having a skill in the art to provide a more realistic waterfowl decoy system that provides vertical movement for waterfowl decoys and simulates the waterfowl taking off from and landing on water. Such improved movement in a decoy spread ultimately advances the decoy spread and thereby increases the chances of luring waterfowl into the hunters spread.

Hunting, and specifically waterfowl hunting, takes place in areas that are remote or otherwise difficult to access, such as near ponds, lakes and other remote bodies of water. Accordingly, it is also a desire to those having skill in the art to provide decoy systems that are effective at attracting waterfowl while being light and easy to move, setup and takedown. This is particularly a desire as decoy systems become more complex with various degrees of movement and rotation, which may include motored devices. For example the Northern Flight Vortex by Cabelas® describes a decoy system requiring a battery operated motor that moves a pair of arms in a horizontal circle with waterfowl decoys attached to the end of each arm. The Vortex system provides horizontal movement by attaching two spinning wing decoys to the end of the arms that are attached to a base that is motorized to make the arms move in a circular motion.

Although this system may effectively simulate waterfowl hovering above the water, it necessarily requires a battery pack and motor within the apparatus itself to create horizontal spinning. With the required battery and motor there also comes an added cost for the product and weight that makes it more challenging to carry out to the spread and takes more time to set up. Additionally, as the battery continually powers the motor, the system has a finite run time before the battery runs out and must be recharged. Once the battery runs out the hunter necessarily has to carry the battery or entire device to a power source for recharging. Conversely, the hunter may elect to setup the Vortex system near a non-battery power source but in doing so limits potential hunting locations. Accordingly, there remains a desire to those having skill in the art to provide a decoy system that does not necessarily require a battery or motor which can be used in more remote hunting location. Further, such an improved system will have less weight for the hunter taking it to the field while providing an unlimited use time where the improved decoy system can be manually actuated.

Additionally, there is a desire to provide improved decoy systems that effectively simulate waterfowl taking off from and landing on water through vertical motion. Known systems that simulate vertical motion include U.S. Pat. No. 6,625,919 which describes a decoy device that uses a seesaw motion to simulate a duck landing and taking off from water. However, this system only provides a single decoy on a single arm and does not provide visual ques on both sides of the actuator facilitating movement of the decoy. The range of motion of this system is also limited where the base is position on the ground, such as a river bank, and the arm extends over the water. Accordingly, the arm and decoy cannot move below the base such as with a raised base or support stand. Thus, there is still a desire to those having skill in the art to provide an improved decoy system with a pair of decoys on opposite ends of a teeter-totter which move in relation to one another and simultaneously simulate landing and taking off on opposite sides of a hinge. Accordingly, such a device would use vertical motion rather than horizontal motion, as in the aforementioned Vortex system, and thereby also increase the height of the decoy for more visibility and range of motion for the decoys.

Other known decoy systems that use vertical motion, including the '919 Patent, require that the base supporting the arm that the decoy is attached to be located on land for use. Most waterfowl hunting involves hunting over water with little to no land available in most circumstances which limits where you can use systems that require land for supporting the base of the decoy system. Accordingly, there is a desire to those having skill in the art to provide a decoy system that may be used in most bodies of water and anywhere on land. Further still, it is a desire to have such system be adjustable in height so that the hunter can particularly select the height of the decoys and overall range of motion of the moving stand.

SUMMARY OF THE INVENTION

The present invention is a decoy stand that simulates waterfowl taking off and landing for use by a hunter to lure waterfowl into a decoy spread. The decoy stand has a crossbeam holding waterfowl decoys on opposite ends of a hinge which raise and lower relative to one another in a teeter-totter motion about the hinge. Accordingly, the decoy stand provides visual ques on both sides of the center hinge and alternate in positions both above and below the hinge that connects the crossbeam to the support beam. To allow the crossbeam to teeter back and forth, a hinge is provided that connects the midpoint of the crossbeam to the top end of the support beam.

The support beam preferably telescopes between multiple positions so that the height of the support beam and distance of the crossbeam from the water can be adjusted based on water depth or desired range of motion of the rotating crossbeam. To support the rotating crossbeam and telescoping support beam, a base is preferably attached to the end of the support beam opposite from the hinge and includes multiple support legs.

In operation, an actuator is connected to the crossbeam and lowers one end of the beam holding one decoy while raising the opposite end of the beam holding either a counterweight or another decoy. Preferably, the actuator is manually powered and is made up of a string, spring and pulley where pulling on the free end of the string causes one end of the crossbeam to lower as the opposite end of the crossbeam raises. Subsequently, when the string is released the spring biases the opposite end of the crossbeam towards the lowered position and subsequently raises the string end of the crossbeam that was lowered when the string was being pulled. Accordingly, as the string is actuated, the string and spring facilitate a teetering motion as the spring vector force and string vector force alternate in raising and lowering opposite ends of the crossbeam above and below the hinge connecting the crossbeam to the support beam.

In another particular aspect of the preferred actuator, the pulley is attached to the support beam between the top end and the bottom end and the string extends from the fixed end on one side of the crossbeam through the pulley to the free end that is grasped by the hunter or other control device. Accordingly, the hunter may actuate the decoy system by pulling on the string or the mechanical control device may be powered on to move the crossbeam. To assure that the string does not interfere with the rotating motion of the crossbeam, it is preferred that the free end of the string is removed from the longitudinal plane in which the crossbeam moves.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 1A shows a perspective view of the decoy stand according to the preferred embodiment described herein.

FIGS. 1B and 1C show detail views of the spring and pulley according to the preferred actuator described herein.

DETAILED DESCRIPTION OF THE PREFERRED EMBODIMENTS

Figures 2A, 2B:
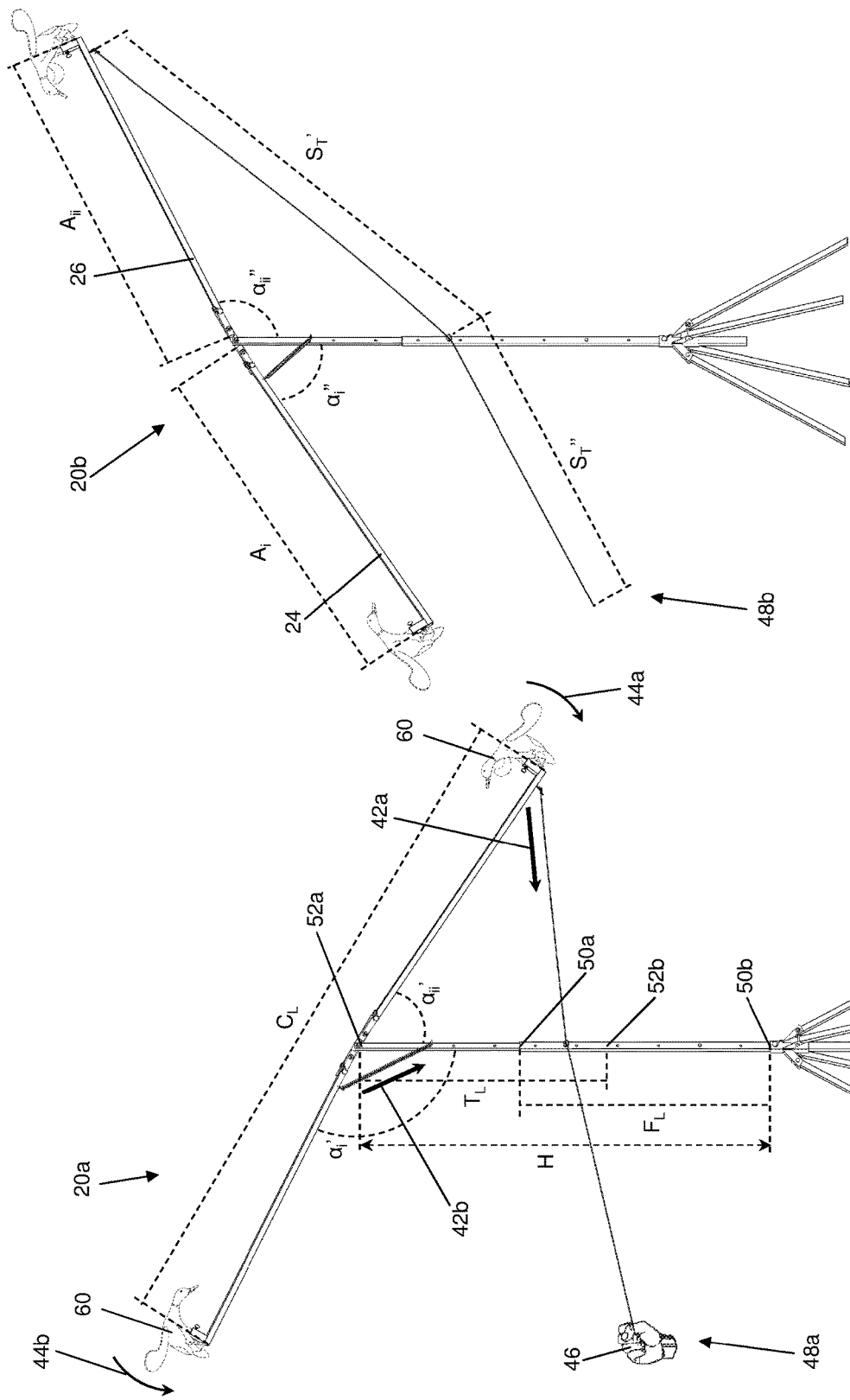
FIGS. 2A and 2B respectively depict the decoy stand in the actuated position and the unactuated position according to the invention described herein.

The following description of the preferred embodiment(s) is merely exemplary in nature and is in no way intended to limit the invention, its application, or uses.

The decoy system 10 with rotating arm consists of a crossbeam 14 connected to a support beam 12 by a hinge 16 with an actuator 18 moving the crossbeam in a seesaw motion within a plane. The seesaw motion of the crossbeam causes one end of the crossbeam to raise in the air above the hinge while the opposite end simultaneously dips towards the water level below the hinge. Accordingly, the crossbeam is connected to the top end of the support beam at the midpoint of the crossbeam by the hinge. Further, mounting brackets 30 are positioned on opposite ends of the crossbeam which hold decoys 60 that simulate waterfowl landing and taking off from water as the crossbeam seesaws back and forth.

As particularly described herein, the support beam includes a top end 22a connected to the support beam mounting portion of the hinge, as described below, and bottom end connected 22b to a base. The hinge is separated from the bottom of the support beam by the height which can be adjusted in the preferred embodiment wherein the support beam has at least one telescoping section as particularly explained herein. Although it will be appreciated that the support beam can be made from a single fixed beam, poll, tube or similar single piece, it is preferred that the support beam telescopes between multiple positions and subsequently has a variable height. Thus, the telescoping section of the support beam allows the overall height of the decoy stand to vary which subsequently allows the hunter to change the height at which the decoys rotate above the water, be used in various water levels and allows a variable range of motion for the rotating crossbeam. Preferably the decoy system operates in water up to four feet deep but it will be appreciated that other variations could operate in other depths of water by merely altering the dimensions of the support beam and crossbeam as described herein.

The telescoping support beam according to the preferred embodiment is made up of a fixed section 50 and a telescoping section 52 where the proximal end of the telescoping section 52a protrudes from the proximal end of the fixed section 50a and connects with the hinge. In operation, the telescoping section slideably engages the fixed section and can telescope between multiple locked positions with the distal end of the telescoping section 52b remaining within the body of the fixed section. To lock the telescoping support beam at a desired height, the telescoping section has multiple aperture sets 56a that align with aperture sets in the fixed section 56b at varying positions and can be locked with one or more pins 58 that are inserted through the aligned apertures in the telescoping and fixed sections as shown in FIG. 1A. In addition, the distal end of the fixed section 50b connects with the base 54 to support the decoy stand There are at least three sets of holes within each of the telescoping section and the fixed section to allow height adjustments for varying water depths or to raise the crossbeam and decoys higher for added visibility. However, it will be appreciated that the number of holes within the fixed and telescoping section may vary depending on the dimensions of a particular stand. For example, a longer support beam may include more locking holes wherein the number of locked positions is greater. Subsequently, the pin can be removed to unlock the telescoping support beam and the height can be further adjusted or the multiple sections can be disassembled for carrying or stowing. Accordingly, the hunter can vary the height of the telescoping support beam by locking the telescoping section at different positions relative to the fixed section based on the holes in which the pins are inserted.

The proximal end of the telescoping section preferably attaches to the hinge and the distal end extends into the body of the fixed section with the base being connected to the outside of the fixed section at its distal end. However, it will be appreciated by those having an ordinary skill in the art that the telescoping section may telescope on the outside of the fixed section where the distal end of the fixed section protrudes from the distal end of the telescoping section. In either arrangement it is an aspect of the decoy stand to have the crossbeam attached to the proximal end of the telescoping section wherein the crossbeam raises and lowers as the height of the support beam is adjusted by changing the distance between the proximal end of the telescoping section at the top of the support beam and the distal end of the fixed section at the bottom of the support beam.

The base of the support beam is preferably made up of multiple support legs 68c that connect to the bottom end of the support beam as shown in FIGS. 1A and 2. As shown, multiple legs extend from the distal end of the fixed section away from the support beam and thereby provide additional support to the decoy stand. As with the pins that lock the height of the telescoping support beam, the leg base is preferably secured to the support beam with a pin 68b that extends through one or more apertures in a bracket 68a connected proximate to the bottom end of the support beam. However, it will be appreciated that other means for securing the leg base to the support beam may be used, such as but not limited to support legs that are integrated with the bottom end of the support beam. Alternatively, it will also be appreciated that support legs may be replaced all together with other types of bases, such as a weighted or unweighted plate stand as commonly used with umbrellas, a bucket filled with sand or soil, or other base designs. Further still, the base may not be used at all and the bottom end of the support beam may simply be buried into the ground.

The crossbeam includes a pair of arm sections that are connected at their proximal ends and include respective decoy mounting brackets 30a & 30b proximate to their distal ends 24b & 26b which support a decoy or counterweight. The crossbeam also has a length ($C_L$) measured between the distal ends of each section on opposite sides of the midpoint. Accordingly, the overall length of the crossbeam includes the lengths of both arm sections ($A_i$ & $A_{ii}$) that are approximately equal to one-half of the overall length of the crossbeam ($A_i/A_{ii}=\frac{1}{2}C_L$). Similarly, the fixed section and telescoping section of the support beam also have respective lengths ($F_L$ & $T_L$) that collectively define the height (H) of the support beam between the top end and the bottom end. As explained above, the support beam according to the preferred embodiment can telescope and therefore includes a variable height. However, at least one of the fixed section length and the telescoping section length is approximately equal to the lengths of the respective pair of arm sections ($F_L/T_L=A_i$ & $A_{ii}$).

As indicated above, at least one decoy is attached to one of the mounting brackets at the end of the crossbeam and there are preferably two decoys with one being attached to each end. If there is only one decoy available, the hunter may attached a counter weight on the opposite end of the decoy so that the decoy does not weigh down one side of the crossbeam without a balancing weight on the other end. Thus, the added weight of the decoy or counter weight further facilitates the rotating motion and assists the string and spring vector forces in moving the crossbeam between the various orientations. It is preferred that spinning-wing decoys are used to provide additional movement to the overall system but it will be appreciated that fixed wing decoys may also be used rather than a spinning wing decoy.

The crossbeam in the preferred embodiment is modular and made from two separable pieces that allow the decoy system to be easily disassembled for transport, stowing and quick assembly in the field, as shown in FIGS. 1 and 2. The crossbeam has a first section arm 24 and a second section arm 26 that are connected to one another and to the crossbeam mounting portion of the hinge with a bracket and fasteners. To assemble the crossbeam, the proximal ends of the arms 24a & 26a are positioned near one another with the hinge situated there between. The ends of the arm bracket 62 is then positioned over the respective proximal ends of the arm section with the hinge at the midpoint of the arm bracket. Subsequently, pins 64 secure the bracket to the arms and hinge as they protrude through apertures near the proximal ends of the arms, the hinge and the bracket as particularly shown in FIG. 1B. As shown, the arm bracket includes two pins for connection to each arm section and a single pivot pin 66 engaging the bracket but it will be appreciated that additional pins could be used in alternative designs. Further, pins may be replaced with alternative removable fasteners.

To disassemble the separable crossbeam, the pins or other fasteners can be removed and the arm sections can be separated from the arm bracket. Alternatively, the arms may remain attached to the arm bracket and fold into a folded carrying configuration. For example, as shown in FIG. 1B, two pins are used in each arm section wherein one of the pins 64a can be removed from each arm section and the arms can subsequently pivot on the remaining pins 64b. Subsequently, to lock the arms sections the arms can be unfolded and the pins can be reinserted to lock the crossbeam in the unfolded configuration. Regardless of the arm and bracket connection, the hinge and crossbeam can be separated from the top of the support beam in a fully disassembled configuration for easy carrying, stowing or cleaning.

In an alternative embodiment the crossbeam is a singular beam with the hinge connected to the midpoint of the beam. When the hunter wants to assemble the stand, the hunter need only engage the crossbeam mounting portion of the hinge with the crossbeam and subsequently connect the other mounting portion of the hinge with the top end of the crossbeam. Accordingly, the crossbeam cannot be broken into multiple sections but the stand can be still be disassembled by disengaging the crossbeam from the support beam.

As referenced above, a hinge pivotally attaches the crossbeam to the support beam and allows the crossbeam to rotate on the top end of the support beam. It will be appreciated that numerous types of hinge assemblies could be effectively used in the decoy stand described herein. In particular, the hinge may be integrated at the midpoint 28 of the crossbeam or the top end of the support beam. Alternatively, the hinge may be a separate piece that merely connects to the midpoint of the crossbeam and the top end of the support beam. Accordingly, the hinge has a support beam mounting portion 32 that connects to the top end of the support beam and a corresponding crossbeam mounting portion 34 that connects to the crossbeam between the arm sections.

It is an aspect of the invention to be able to easily remove the crossbeam from the support beam and thus the fasteners used to connect the two may be any number of commonly used fasteners. In the preferred decoy stand embodiment, the hinge is positioned between the proximal ends of the first section and the second section and has a pivot pin that extends through an aperture in the top portion of the support beam as shown in FIG. 1B. Subsequently, the end of the pivot pin is connected to the mounting bracket and the crossbeam is thereby connected to the support beam by the hinge with the pivot pin providing a pivot axis on which the crossbeam rotates.

When in operation the hinge allows the crossbeam to rotate on the of the top support beam. As shown in FIG. 2A, the crossbeam has a first orientation 20a with one end of the crossbeam raised above the hinge and the opposite end of the crossbeam below the hinge. Subsequently, the hinge allows the crossbeam to move to the second orientation 20b in FIG. 2B with the first end of the crossbeam below the hinge and the opposite second end of the crossbeam above the hinge. Accordingly the first angle between the first section of the crossbeam and the support beam and the second angle between the second section of the crossbeam and the support beam vary as the crossbeam rotates between the various orientations. As shown in FIG. 2A, the first angle is an obtuse angle ($\alpha_i'>90°$) and the second angle is an acute angle ($\alpha_{ii}'<90°$) when the crossbeam is in the first orientation. Conversely as shown in FIG. 2B, the first angle is an acute angle ($\alpha_i''<90°$) and the second angle is an obtuse angle ($\alpha_{ii}'>90°$) in a second orientation.

Accordingly, the decoy stand has multiple orientations where the crossbeam is in various orientations relative to the support beam as defined by the pair of angles between the ends of the crossbeam and the support beam which vary as the crossbeam teeters back and forth. As the crossbeam rotates between the multiple decoy positions the first angle and the second angle move between an acute angle and an obtuse angle. Additionally, the pair of angles come to rest at approximately 90° when the actuator is not actuated and the spring has biased the crossbeam to the perpendicular position. It will also be appreciated that the crossbeam rotates within a plane aligned with the longitudinal axis of the crossbeam.

In another aspect of the decoy stand, an actuator is provided to move the crossbeam and decoys between the various orientations. The preferred actuator includes a moving section made up of a string 38 and spring 40 that operate in connection with a static section which preferably includes a pulley 36 connected to the support beam. The moving section attaches between the crossbeam and support beam and the fixed section is connected to the support beam and engages the moving section. Thus, when the moving section is actuated, the crossbeam rotates on the top of the support beam within the plane.

As particular shown in FIG. 1B, one end of the spring 40a connects to the first section of the crossbeam and the opposite end of the spring 40b connects to support beam. Conversely, the fixed end 38a of the string connects to the opposite second section of the crossbeam proximate to the distal end. The length of the string ($S_T$) is then run from the fixed end through the pulley to the free end 38b that engages the controlling device described below. As shown in FIG. 1C, the static pulley is connected to the support beam beneath the spring connection.

When a single support beam is used instead of the preferred telescoping support beam, the spring is connected proximate to the top end of the support beam and the pulley is connected to a position beneath the spring connection. Alternatively, the spring is connected to the telescoping section of the support beam and the pulley is connected to the fixed section of the support beam in the preferred telescoping embodiment. As shown in FIG. 1B, the spring is connected above the last set of apertures so that the spring connection does not interfere with the telescoping portion as it slides between the multiple positions. Further, as shown in FIG. 1C, the pulley is connected near the proximal end of the fixed section and may be integrated thereto as shown in the Figures or removable. For example, a removable pulley may include a shank section that engages the pin apertures in the telescoping and fixed section of the support beam allowing the hunter to adjust the height of the pulley as needed.

In the preferred method of operation, the hunter controls the rotating motion by pulling the free end of the string to move the decoys between multiple positions and simulate decoys landing and taking off from the water. Accordingly, the free end of the string extends away from the pulley to the hunter who, acting as a control device 46, holds a grasping point at the opposite end of the string from the fixed end connected to the end of the crossbeam. Alternatively, other types of controlling devices can engage the free end of the string and subsequently pull the string to move the crossbeam. For example, it will be appreciated by those having skill in the art that the controlling device does not necessarily need to be human controlled as described above. In particular, an electric controller, pneumatic controller, hydraulic controller or various other controlling devices could be attached to the free end of the string and subsequently actuate the rotating motion. However, it is preferred that the control device is manual so that the hunter does not necessarily need to carry an additional device to the field and the runtime of the decoy stand is not finite based on power supply.

As the crossbeam is rotating within the plane aligned with the longitudinal axis of the crossbeam, the free end of the string extends the string length from the fixed end through the pulley to a position that is removed from the longitudinal plane. Accordingly, the crossbeam, spring and a portion of the string between the fixed end and the pulley ($S_T'$) are positioned within the plane. If a hunter or other control device is pulling the string to actuate the motion of the crossbeam and they are standing in direct line with the longitudinal plane of the crossbeam, there is a chance the string will hit the wing of the decoy or the crossbeam as the ends of the beam dip below the hinge. To overcome this limitation, the portion of the string between the pulley and the free end ($S_T''$) is removed from the longitudinal plane and is preferably at least two feet or more from the longitudinal plane so the string will not interfere with the decoy. Collectively, both portions of the string define the overall length of the string which may vary relative to the intended profile of the decoy stand or the distance the hunter or similar mechanical control device is positioned away from the stand.

Regardless of which control device is used, the actuator has an actuated position 48a and an unactuated position 48b where the string transmits a string vector force 42a to an end of the crossbeam in the actuated positon and the spring force transmits an opposite spring vector force 42b to the crossbeam. As it is an aspect of the system to provide a seesaw motion, the string vector force and the spring vector force are opposite and facilitate the teetering of the crossbeam as stated above. Accordingly, the string vector force rotates the crossbeam in one rotational direction 44a and the spring vector force rotates the crossbeam in an opposite rotation direction 44b wherein the crossbeam will continually alternate rotational directions so long as the actuator is being actuated. Once actuation is stopped, the spring and string vector forces will dissipate and the crossbeam will come to rest in substantially perpendicular position shown in FIG. 1A.

Along with the string transmitting the string vector force to the crossbeam when the string is pulled by the hunter, or otherwise actuated, the spring further facilitates movement of the crossbeam with a spring vector force that is opposite to the string vector force. When the preferred extension spring is used, one end of the spring is attached to the opposite side of the crossbeam from the string and stretches the length of the spring (Sp) to the opposite end attached to a position near the top end of the support beam. As the hunter pulls the string, the force of the string lowers one end of the crossbeam which subsequently raises the opposite end of the crossbeam as shown in FIG. 2A. As this motion occurs, the spring stretches and transmits an opposite string vector force to the crossbeam from the string vector force being transmitted to the crossbeam by the control device and string. Accordingly, when the hunter lets go of the string or the control device otherwise releases the string or provides slack in the string, the spring force biases the spring side of the crossbeam towards the lowered position shown in FIG. 2B. Accordingly, the alternate rotating motion continues so long as the spring force and string force continuously alternate.

Although it is preferred that an extension spring be used that is attached to the opposite side of the crossbeam from the string and pulls the arm section down when the string is actuated, it will be appreciated by those having an ordinary skill in that art that a compression spring could be used where the spring engages the crossbeam on the same side of the string and pushes the crossbeam up rather than pulling the opposite side of the crossbeam down. In operation, the compression spring compresses as the string is being actuated by the control device. Subsequently, when the string is released the compressed spring extends and the spring vector force biases the crossbeam in the opposite direction as the string vector force.

Although momentum may cause the crossbeam to continue to rotate after the control device is powered off or the hunter releases the free end of the string, the spring and string forces will eventually dissipate and the crossbeam will balance into a still position where the crossbeam is substantially perpendicular to the support beam as shown in FIG. 1A. Accordingly, the action of engaging the free end of the string provides vertical movement at both ends of the crossbeam and thereby causes the decoy attached to the ends of the beam to move up and down and provide visual ques on both sides of the hinge. Simultaneously, as the string is actuated the spring extends and contracts and applies a force to the opposite side of the crossbeam.

In an alternative actuator embodiment, the string, spring and pulley assembly may be replaced with various other actuators that are capable of rotating the crossbeam between the various orientations. For example, a motor or other remotely actuated device could be connected to one or more of the crossbeam and support beam and rotate the crossbeam between the various. Other embodiments of actuator may include an electronic or a pneumatic strut that connects between one end of the crossbeam and the support beam. In operation, extension of the strut could raise one end of the crossbeam and the subsequent retraction of the strut would lower the end of the crossbeam.

Although the particular dimensions and shapes of the crossbeam, support beam and base are not intended to be limiting and it will be appreciated by those having skill in the art that the structural details may vary, the preferred decoy system is made with the following structural specifications. The support beam is made up of a fixed bottom section and a telescoping top section where the bottom section is made from 1 inch square tubing approximately 4 feet in length. The drill holes into which the aforementioned pins are inserted are preferably 5/16 inch with the first hole being spaced 1 inch below the top end, the second hold being spaced 2 feet below the top hole, and the third hole being spaced 1 foot below the second hole and 11 inches above the bottom end of the bottom section. Subsequently, the telescoping top section is made from 3/4 inch square tubing that is approximately 5 feet in length and similarly has three drill holes where the first hole is 2 feet below the top end, the second hole is 2 feet below the first hole and the third hole is 1 foot below the second hole and 1 foot above the bottom end of the top section.

Like the support beam, the preferred crossbeam is made from two pieces of square tubing but which have the same diameter, namely 3/4 inch. Each section of the crossbeam is approximately 4 feet in length and each section has 5/16 inch drill holes mirrored on each section about the midpoint with the first hole being 1 1/4 inches from the midpoint and the second hole being 4 1/4 inches away from the side end and 3 inches from the first hole. Additionally, a mounting bracket is attached to the end of each section and preferably is a 3/4 inch square tube having a total length of 2 inches and is attached to the crossbeam on the opposite side as the string and spring.

To connect the pair of crossbeam sections, the arm bracket extends over the proximal ends and is preferably U-shaped with a 1 inch width, 1 foot length and 1/8 inch thick. As with the other drill holes described above, the bracket has 5/16 inch drill holes with the first drill hole being in the middle of the sidewall of the bracket, approximately 6 inches from each end, a pair of second holes 2 inches from each side of the middle hole, and a pair of third holes being 5 inches from the center hole and 1 inch from the respective ends of the bracket.

A leg bracket is connected to the bottom end of the support beam which is attached with a centerpiece made from 1 1/4 inch square tubing that is 3 inches in length through which the bottom section of the support beam slides. The leg bracket is attached with pins through holes in the center piece that are 1/2 inch from the top end of the center piece. Additionally, leg supports are attached near the bottom end of the center piece and are made from flat bar that is 1 inch wide, 2 1/2 inches long and 1/8 thick. A total of eight pieces of flat bar are used with two pieces being attached on each side of the square center piece for leg supports. To attach the legs 5/16 inch drill holes are drilled into the sides of the leg supports which are approximately 1/2 inches from the outside edge. Additionally, leg stops made from 1/4 inch round stock 1 1/2 inches in length are welded between the leg support pieces on the top outside edge which accordingly form four leg supports. Subsequently, legs made from 3/4 inch square tubes are inserted into the leg supports and connected thereto by bolts or pins interested through the drill holes in the leg supports and legs. To fit the proper pin size the legs also have 5/16 inch drill holes spaces 1/2 inch form the end inserted into the leg supports and the legs preferably have a total length of 2 feet to adequately stabilize the decoy stand.

The embodiments were chosen and described to best explain the principles of the invention and its practical application to persons who are skilled in the art. As various modifications could be made to the exemplary embodiments, as described above with reference to the corresponding illustrations, without departing from the scope of the invention, it is intended that all matter contained in the foregoing description and shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. A decoy stand, comprising:
   a support beam comprising a top end and a bottom end;
   a crossbeam comprising a first section, a second section and a midpoint, wherein the first section comprises a first section proximal end, a first section distal end and a first section mounting bracket, wherein the second section comprises a second section proximal end, a second section distal end and a second section mounting bracket, wherein the midpoint is positioned between the first section proximal end and the second section proximal end, and wherein the first section mounting bracket and the second section mounting bracket are respectively positioned proximate to the first section distal end and the second section distal end;
   a hinge pivotally attaching the support beam to the crossbeam, wherein the hinge comprises a support beam mounting portion and a crossbeam mounting portion, wherein the top end of the support beam connects to the support beam mounting portion, wherein the first section proximal end and the second section proximal end connect to the crossbeam mounting portion, wherein the crossbeam rotates about the hinge between a first orientation and a second orientation within a plane, wherein the first orientation and the second orientation respectively comprise a first angle between the first section and the support beam and a second angle between the second section and the support beam, wherein the first angle is obtuse and the second angle is acute in the first orientation, and wherein the first angle is acute and the second angle is obtuse in a second orientation; and
   an actuator in operative connection with the crossbeam and the support beam, wherein the actuator transmits a force to the crossbeam to rotate the crossbeam between the first orientation and the second orientation.

2. The decoy stand of claim 1, wherein the actuator further comprises a pulley, a string and a spring, wherein the pulley is mounted to the support beam between the top end and the bottom end, wherein the string comprises a fixed end, a free end, and a string length, wherein the fixed end connects to the second section of the crossbeam, wherein the string extends the string length from the fixed end through the pulley to the free end, wherein the spring comprises a first spring end, a second spring end and a spring length, wherein the first spring end connects to one of the first section and the second section of the crossbeam, and wherein the spring extends the spring length from the first spring end to the second spring end connected to the support beam between the top end and the pulley.

3. The decoy stand of claim 2, wherein the force comprises a string vector force in a first rotational direction and a spring vector force in an opposite rotational direction from the first rotational direction, wherein the string transmits the string vector force to the second section of the crossbeam and biases the crossbeam in the first rotational direction, and wherein the spring transmits the spring vector force to one of the first section and the second section of the crossbeam and biases the crossbeam in the opposite rotational direction from the first rotational direction.

4. The decoy stand of claim 3, wherein the actuator further comprises a control device selected from the group consisting of a human controller, an electric controller, a pneumatic controller, and a hydraulic controller, wherein the control device engages the free end of the string, wherein the control device moves the string between an actuated position and an unactuated position, wherein the string vector force and the spring vector force are transmitted to the crossbeam in the actuated position, and wherein no string vector force is transmitted to the crossbeam in the unactuated position.

5. The decoy stand of claim 2, wherein the crossbeam extends a crossbeam length between the first section distal end and the second section distal end, wherein the crossbeam, the support beam, the spring and the fixed end of the string are positioned within the plane, wherein the free end of the string is positioned outside of the plane, and wherein the actuator is actuated by pulling the string at the free end.

6. The decoy stand of claim 1, wherein the support beam further comprises a fixed section and a telescoping section, wherein the telescoping section slideably engages the fixed section and telescopes between a plurality of positions, wherein the telescoping section comprises a telescoping section proximal end and a telescoping section distal end, wherein the fixed section comprises a fixed section proximal end and a fixed section distal end, wherein the telescoping section proximal end extends from the fixed section proximal end and connects to the support beam mount portion of the hinge, and wherein a base is connected to the fixed section distal end.

7. The decoy stand of claim 6, wherein the telescoping section and the fixed section respectively comprise a telescoping section length and a fixed section length between the respective proximal and distal ends, wherein a support beam height varies relative to a distance between the telescoping section proximal end and the fixed section distal end in the plurality of positions, wherein the first section and the second section respectively comprise a first section length and a second section length between the respective proximal and distal ends, wherein the first section length and the second section length are approximately equal, and wherein the respective first section length and the second section length are approximately equal to at least one of the telescoping section length and the fixed section length.

8. The decoy stand of claim 6, wherein the telescoping section and the fixed section respectively comprise a plurality of pin apertures, wherein a set of telescoping section pin apertures align with a set of fixed section pin apertures in each of the plurality of positions, wherein a support beam pin removably extends through the aligned sets of telescoping section pin apertures and fixed section pin apertures in a locked support beam orientation, and wherein the pin is removed from the aligned sets of telescoping section pin apertures and fixed section pin apertures in an unlocked support beam orientation.

9. The decoy stand of claim 1, wherein the crossbeam further comprises a singular beam, wherein the support beam comprises a height, wherein the singular beam comprises a singular beam length, wherein the singular beam length is at least half the height, wherein the first section proximal end and the second section proximal are respectively integrated with one another, wherein the support beam mounting portion of the hinge engages the top end of the support beam and the crossbeam mounting portion of the hinge engages the midpoint of the crossbeam in an assembled arrangement, and wherein at least one of the support beam mounting portion of the hinge and the crossbeam mounting portion of the hinge are respectively disengaged from the top end of support beam and the midpoint of the crossbeam in a disassembled arrangement.

10. The decoy stand of claim 1, wherein the crossbeam further comprises a modular beam, wherein the modular beam comprises a bracket and a plurality of fasteners, wherein the bracket and the plurality of fasteners removably connect the first section proximal end and the second section proximal end, wherein the support beam mounting portion of the hinge engages the top end of the support beam and the crossbeam mounting portion of the hinge engages the bracket between the first section proximal end and the second section proximal end in an assembled arrangement, and wherein at least one of the support beam mounting portion of the hinge and the crossbeam mounting portion of the hinge are respectively disengaged from the top end of support beam and the bracket between the first section proximal end and the second section proximal end in a disassembled arrangement.

11. The decoy stand of claim 1 further comprising a first decoy and at least one of a second decoy and a counter weight, wherein the first decoy is removably connected to one of the first section mounting bracket and the second section mounting bracket, and wherein at least one of the second decoy and the counter weight are connected to the opposite of the first section mounting bracket and the second section mounting bracket from the first decoy.

12. The decoy stand of claim 11, wherein the first decoy and the second decoy are selected from the group consisting of a static-wing waterfowl decoy and a spinning-wing waterfowl decoy.

13. A decoy stand, comprising:
a support beam comprising a telescoping section and a fixed section, wherein the telescoping section slideably engages the fixed section and telescopes between a plurality of positions, wherein the telescoping section comprises a telescoping section proximal end and a telescoping section distal end, wherein the fixed section comprises a fixed section proximal end and fixed section distal end, wherein the telescoping section and the fixed section respectively comprise a telescoping section length and a fixed section length between the respective proximal and distal ends, and wherein a support beam height varies relative to a distance between the telescoping section proximal end and the fixed section distal end in the plurality of positions;
a crossbeam comprising a first section, a second section and a midpoint, wherein the first section comprises a first section proximal end, a first section distal end, a first section mounting bracket, wherein the second section comprises a second section proximal end, a second section distal end and a second section mounting bracket, wherein the midpoint is positioned between the first section proximal end and the second section proximal end, wherein the first section and the second section respectively comprise a first section length and a second section length between the respective proximal and distal ends, wherein the first section length and the second section length are approximately equal, wherein the first section length and the second section length are approximately equal to at least one of the telescoping section length and the fixed section length, and wherein the first section mounting bracket and the second section mounting bracket are respectively positioned proximate to the first section distal end and the second section distal end;
a hinge pivotally attaching the support beam to the crossbeam, wherein the hinge comprises a support beam mounting portion and a crossbeam mounting portion, wherein the top end of the support beam connects to the support beam mounting portion, wherein the first section proximal end and the second section proximal end connect to the crossbeam mounting portion, wherein the crossbeam rotates about the hinge between a first orientation and a second orientation within a plane, wherein the first orientation and the second orientation respectively comprise a first angle between the first section and the support beam and a second angle between the second section and the support beam, wherein the first angle is obtuse and the second angle is acute in the first orientation, and wherein the first angle is acute and the second angle is obtuse in a second orientation; and
an actuator in operative connection with the crossbeam and the support beam, wherein the actuator transmits a force to the crossbeam to rotate the crossbeam between the first orientation and the second orientation.

14. The decoy stand of claim 13, wherein the actuator comprises a pulley, a string and a spring, wherein the pulley is mounted to the fixed section between the fixed section proximal end and the fixed section distal end, wherein the string comprises a fixed end, a free end, and a string length, wherein the fixed end connects to the second section of the crossbeam, wherein the string extends the string length from the fixed end through the pulley to the free end positioned outside of the plane, wherein the spring comprises a first spring end, a second spring end and a spring length, wherein the first spring end connects to one of the first section and the second section of the crossbeam, and wherein the spring extends the spring length from the first spring end to the second spring end connected to the telescoping section between the telescoping section proximal end and the fixed section proximal end.

15. The decoy stand of claim 14, wherein the force comprises a string vector force in a first rotational direction and a spring vector force in an opposite rotational direction from the first rotational direction, wherein the string transmits the string vector force to the second section of the crossbeam and biases the crossbeam in the first rotational direction, and wherein the spring transmits the spring vector force to one of the first section and the second section of the crossbeam and biases the crossbeam in the opposite rotational direction from the first rotational direction.

16. The decoy stand of claim 13 further comprising a first decoy and at least one of a second decoy and a counter weight, wherein the first decoy is removably connected to one of the first section mounting bracket and the second section mounting bracket, and wherein at least one of the second decoy and the counter weight is connected to the opposite of the first section mounting bracket and the second section mounting bracket from the first decoy.

17. The decoy stand of claim 13, wherein the crossbeam is selected from the group consisting of a singular beam and a modular beam, wherein the singular beam comprises an integrated first section and second section, and wherein the modular beam comprises a separable first section and second section.

18. A decoy stand, comprising:
a support beam comprising a top end and a bottom end;
a crossbeam comprising a first section, a second section and a midpoint, wherein the first section comprises a first section proximal end, a first section distal end and a first section mounting bracket, wherein the second section comprises a second section proximal end, a second section distal end and a second section mounting bracket, wherein the midpoint is positioned between the first section proximal end and the second section proximal end, wherein the first section mounting bracket and the second section mounting bracket are respectively positioned proximate to the first section distal end and the second section distal end, and wherein a first decoy and a second decoy are removably attached to the first section mounting bracket and the second section mounting bracket, respectively;

a hinge pivotally attaching the support beam to the crossbeam, wherein the hinge comprises a support beam mounting portion and a crossbeam mounting portion, wherein the top end of the support beam connects to the support beam mounting portion, wherein the first section proximal end and the second section proximal end connect to the crossbeam mounting portion, wherein the crossbeam rotates about the hinge between a first orientation and a second orientation within a plane, wherein the first orientation and the second orientation respectively comprise a first angle between the first section and the support beam and a second angle between the second section and the support beam, wherein the first angle is obtuse and the second angle is acute in the first orientation, and wherein the first angle is acute and the second angle is obtuse in a second orientation; and an actuator in operative connection with the crossbeam and the support beam, wherein the actuator comprises a pulley, a string and a spring, wherein the pulley is mounted to the support beam between the top end and the bottom end, wherein the string comprises a fixed end, a free end, and a string length, wherein the fixed end connects to the second section of the crossbeam, wherein the string extends the string length from the fixed end through the pulley to the free end positioned outside of the plane, wherein the spring comprises a first spring end, a second spring end and a spring length, wherein the first spring end connects to one of the first section and the second section of the crossbeam, wherein the spring extends the spring length from the first spring end to the second spring end connected to the support beam between the top end and the pulley, wherein the string transmits a string vector force to the second section in a first rotational direction, wherein the spring transmits a spring vector force to one of the first section and the second section in an opposite rotational direction, and wherein the string vector force and the spring vector force rotate the crossbeam between the first orientation and the second orientation.

19. The decoy stand of claim 18, wherein the support beam further comprises a telescoping section and a fixed section, wherein the telescoping section slideably engages the fixed section and telescopes between a plurality of positions, wherein the telescoping section comprises a telescoping section proximal end and a telescoping section distal end, wherein the fixed section comprises a fixed section proximal end and fixed section distal end, wherein the telescoping section and the fixed section respectively comprise a telescoping section length and a fixed section length between the respective proximal and distal ends, wherein a support beam height varies relative to a distance between the telescoping section proximal end and the fixed section distal end in the plurality of positions, and wherein a crossbeam length between the first section distal end and the second section distal end is approximately twice one of the fixed section length and the telescoping section length.

20. The decoy stand of claim 18, wherein the actuator further comprises a control device selected from the group consisting of a human controller, an electric controller, a pneumatic controller, and a hydraulic controller, wherein the control device engages the free end of the string, wherein the control device moves the string between an actuated position and an unactuated position, wherein the string vector force and the spring vector force are transmitted to the crossbeam in the actuated position, and wherein no string vector force is transmitted to the crossbeam in the unactuated position.

* * * * *